March 7, 1967
E. E. AUSTIN ETAL
3,308,474
TRAVEL LIMITING MECHANISM
Filed Feb. 25, 1965
2 Sheets-Sheet 1
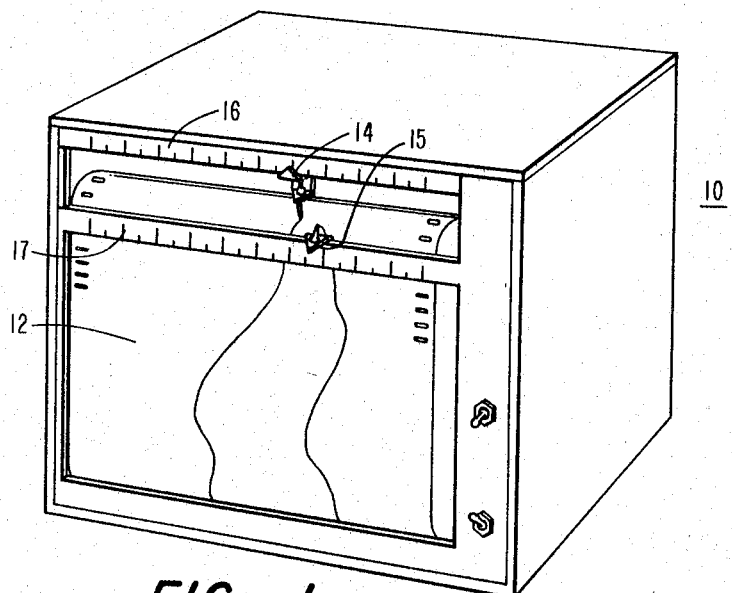
FIG.—1
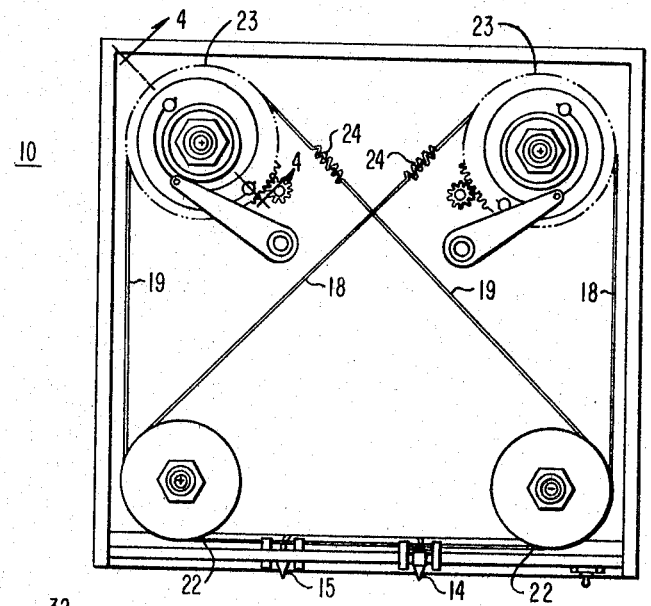
FIG.—2
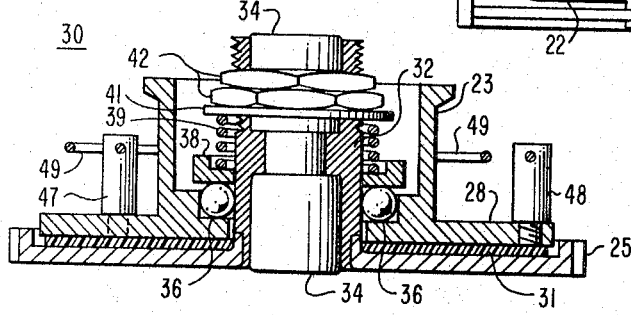
FIG.—4
INVENTORS
EDWARD E. AUSTIN
RICHARD M. KEMPLIN
BY Fraser and Bogucki
ATTORNEYS March 7, 1967 E. E. AUSTIN ETAL 3,308,474
TRAVEL LIMITING MECHANISM
Filed Feb. 25, 1965 2 Sheets-Sheet 2
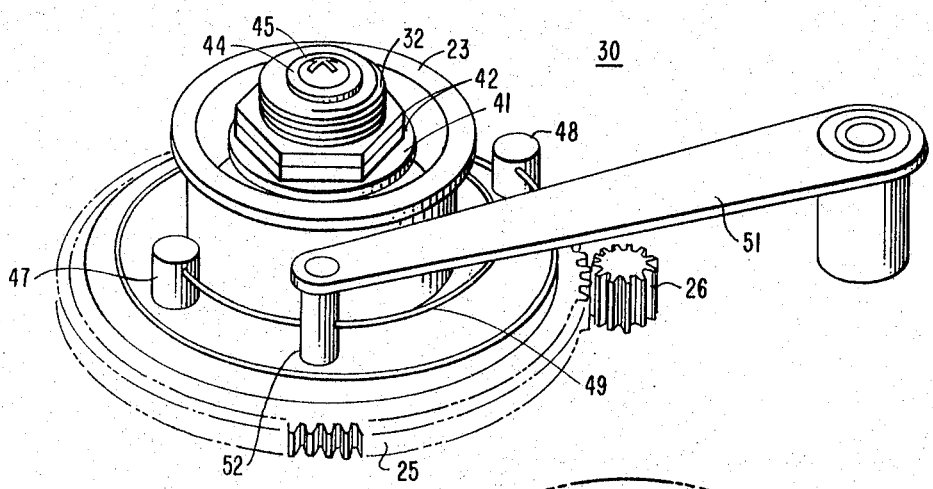
FIG.—3
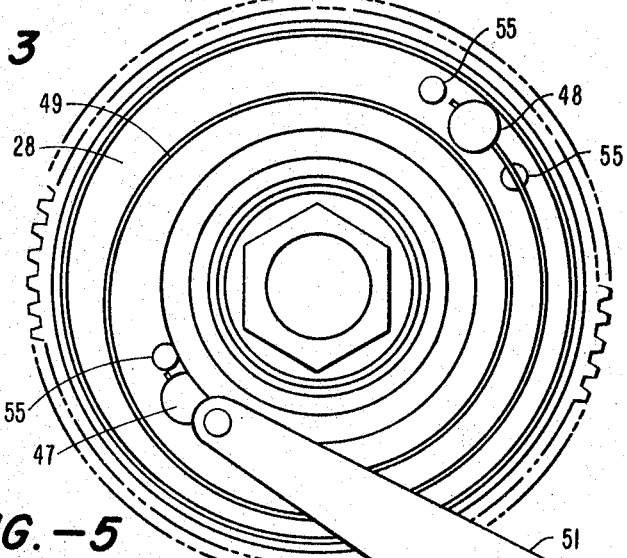
FIG.—5
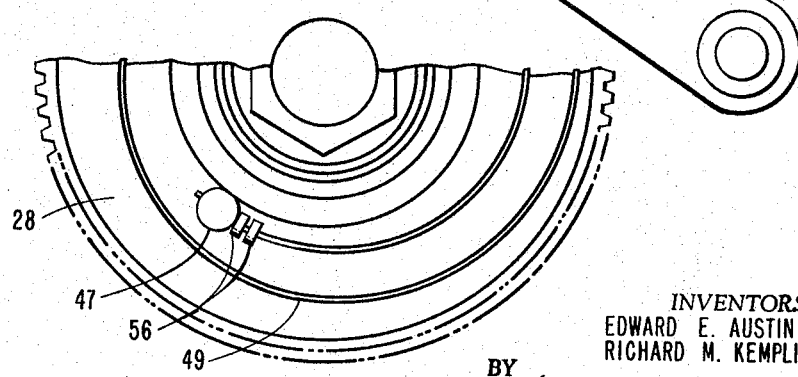
FIG.—6
INVENTORS
EDWARD E. AUSTIN
RICHARD M. KEMPLIN
BY Fraser and Bogucki
ATTORNEYS

United States Patent Office 3,308,474
Patented Mar. 7, 1967

3,308,474
TRAVEL LIMITING MECHANISM
Edward E. Austin, Pasadena, and Richard M. Kemplin, Altadena, Calif., assignors to Hewlett-Packard Company, a corporation of California
Filed Feb. 25, 1965, Ser. No. 435,136
11 Claims. (Cl. 346—139)

This invention relates to arrangements for controlling the limits of travel of a moveable element, and more particularly to such arrangements which may be employed in a curve follower device for the purpose of limiting the travel of a recording pen.

In a graphical recorder of the strip chart type, the pen mechanism is generally controlled to move back and forth in only one direction in a plane parallel to the surface of the paper, while the remaining direction of the travel is taken care of by a movement of the chart underneath the pen, usually at a uniform rate of speed so as to provide a linear time base for the graph being recorded. Strip chart recorders may be used on different jobs to record a variety of variables, represented as voltages of substantially different amplitudes. Thus it is desirable in a strip chart recorder to have an arrangement whereby a reference level for the setting of the recording pen mechanism may be easily adjusted, for example to some expected average about which the input voltage is likely to fluctuate. Also, a similar arrangement is necessary to prevent the pen mechanism from going off the chart in response to a variation of the input voltage beyond the limit which the scale of the recording mechanism is set to accommodate. It is possible to meet both of these problems by providing a stop mechanism which can be adjusted for setting the position of the pen at the start of a graphical plot, but most mechanisms of this type, priorly known, have proved undesirably cumbersome.

It is important that any such mechanism be relatively simple and inexpensive, and that it not add unduly to the weight of the arm controlling the position of the pen mechanism. The pen positioning mechanism should be relatively lightweight in order to permit a rapid response to sudden variations in the applied voltage. The problem is rendered more difficult where a plurality of independently controlled pen mechanisms is incorporated to develop a multitrack record. In such a case, a corresponding plurality of travel limiting mechanisms must be provided without developing interference between the mechanisms. Furthermore, it is particularly important that the arrangements be compact where they are to be used in conjunction with a small, portable graphical recorder.

Accordingly, it is a general object of the present invention to provide an improved travel limiting mechanism for use with a recording pen in a graphical recorder.

More particularly, it is an object of the present invention to provide an improved travel limiting mechanism for use in a strip chart recorder having two or more pens.

It is a further object of the present invention to provide a travel limiting mechanism which is compact, reliable in operation, and inexpensive.

It is a further object of the present invention to provide a travel limiting mechanism in which the extent of the travel permitted by a movable member may be readily adjusted.

In brief, particular arrangements in accordance with the present invention employ a cable driven pen mechanism in which the drive cable is driven by a pulley or sheave coupled to a drive motor by a clutch. A travel limiting or stop mechanism in the form of a spirally distributed stop guide suspended between a pair of fixed stops is attached to the cable sheave. A radial member is arranged to ride along the spiral guide and limit further rotation of the cable sheave when the stop is encountered at one end or the other of the spiral guide. At this point in the travel of the mechanism further pen travel is limited, even though the drive motor may continue rotating, by virtue of slippage in the clutch between the cable sheave and the motor gear sheave. By adjusting the position of the pen relative to a given setting of the drive motor through the slippage of the clutch, a reference position for the pen may be readily established. Moreover, the stops at the ends of the spiral guide serve to prevent the pen from being moved outside of the limits in which a graph is to be drawn on the strip chart paper being transported through the recorder.

In accordance with an aspect of the invention, the spiral guide for the travel limiting mechanism is arranged to extend over substantially more than one complete circle, thus permitting the rotation of the cable sheave being driven by the drive motor through substantially more than 360° of travel. In accordance with a further aspect of the invention, a travel limiting mechanism may include an arrangement for adjusting the effective length of the spiral guide in order to vary the extent of travel permitted by the mechanism. In one particular embodiment thereof, the cable sheave on which the travel limiting mechanism is mounted is provided with a plurality of mounting holes for the stops supporting the spiral guide. In another particular arrangement in accordance with the invention, a number of spacers are arranged to be positioned on the spiral guide at one end thereof so that the point at which the rotation of the cable sheave is arrested at one end of the travel of the pen mechanism may be adjusted by adding or taking away spacers from the guide. As a result, a particularly compact travel limiting mechanism may be provided which permits the incorporation of two or more such mechanisms for driving independently two or more pens on a strip chart recorded in an extremely compact configuration.

A better understanding of the invention may be had from a consideration of the following detailed description, taken in conjunction with the accompanying drawings, wherein:

FIG. 1 is a perspective view of a strip chart recorder of the type in which the invention may be practiced to advantage;

FIG. 2 is a plan view of particular arrangements in accordance with the invention;

FIG. 3 is a more detailed perspective view of a portion of the arrangement of FIG. 2;

FIG. 4 is a sectional view taken along the line 4—4 of FIG. 2;

FIG. 5 is an enlarged plan view of one particular arrangement in accordance with the invention which may be used in the mechanism of FIG. 2; and FIG. 6 is a partial plan view illustrating another particular arrangement which may be employed in the mechanism of FIG. 2.

FIG. 1 depicts a graphical recorder 10 of the strip chart type in which a strip chart 12 is moved from one roller to another in the recorder while a graphical record is traced thereon. In the recorder 10 shown in FIG. 1, a pair of pens 14 and 15 are shown with each being controlled independently to provide its own recorded trace. Each of the pens 14, 15 has a pointer which moves adjacent a scale, 16 or 17, thus providing an indication of the voltage level being recorded, as well as a record trace deposited by the associated pen.

FIG. 2 is a plan view of the recorder 10 of FIG. 1 with the cover removed. It may be seen that both the upper pen 14 and the lower pen 15 are affixed to separate drive cables 18 and 19, each individually connected in a triangular loop about drive pulleys 22 and a cable drive sheave 23. The cables 18 and 19 are maintained taut by springs 24 incorporated in the irrespective loops.

The travel limiting mechanism 30 may be seen in better detail in the perspective view thereof of FIG. 3 and in the sectional view of FIG. 4, which is a section taken along the line 4—4 of FIG. 2, looking in the direction of the arrows. As shown, the mechanism 30 comprises a cable sheave 23 and a sheave gear 25, the latter arranged to be driven by a motor drive gear 26. The cable sheave 23 includes an extended face plate portion 28 which forms part of the slippable clutch with the inner face of the sheave gear 25. The two members are separated by a clutch pad 31 which may be of a cork material to transmit rotational force up to a predetermined level between the surfaces of 23, 25, while permitting slippage between the two if rotational resistance is encountered above that level. A threaded needle bearing housing 32 is affixed to the gear sheave 25 by swaging, and needle bearings 34 are pressed into the upper and lower recesses of the needle bearing housing 32. Ball bearings such as 36 are held in place in a recess of the cable sheave 23 by means of a pressure disk 38 and spring 39 with the pressure being adjustable by means of a washer 41 and a pair of retaining nuts 42 threaded onto the needle bearing housing 32. The entire assembly is mounted on a shaft (not shown) by a washer 44 and screw 45.

Extending upwardly from the extended face portion 28 of the cable sheave 23 are a pair of stops 47 and 48 in which a spiral guide 49 is mounted. A stop arm 51, mounted to the chassis at one end to permit angular rotation, incorporates a guide follower 52 as shown in FIG. 3. The guide follower 52 has an aperture through which the spiral guide 49 passes.

In operation, the depicted travel limiting mechanism is driven by the motor drive gear 26 engaging the sheave gear 25. Rotational force is transmitted through the clutch pad 31 to the cable sheave 23 which thereby drives the associated cables 18 or 19 to move the corresponding pen mechanism 14 or 15. In the arrangement as depicted, the stops 47 and 48 are positioned approximately 180° apart about the periphery of the face plate portion 28 of the cable sheave 23. The spiral guide 49 is mounted in approximately 1½ turns between the stops 47 and 48. As the sheave gear 25 is rotated, the cable sheave 23 also rotates, carrying with it the travel limiting mechanism comprising the stops 47, 48 and the spiral guide 49. The guide follower 52 tracks along the guide 49 as the cable sheave 23 is rotated until it encounters one of the stops 47 or 48. The guide follower 52, by virtue of its rotational freedom in the mounting of the stop arm 51, is permitted to move radially with respect to the cable sheave 23, but when it encounters the stop 47 or 48, it can follow the guide 49 no farther and thus the cable sheave 23 is prevented from further rotation in that direction. Thereafter, should the sheave gear 25 continue to be driven in the same direction, slippage is permitted by the clutch pad 31 so that the cable sheave 23 no longer rotates. Thus the associated pen 14 or 15 is prevented from running past a preset limit in tracing a particular curve on the strip chart 12.

FIG. 5 is a plan view of a portion of the mechanism of FIGS. 3 and 4 illustrating a particular aspect of the invention whereby a plurality of mounting holes 55 are provided in the extended face plate portion 28 of the cable sheave 23 in order to permit a selective variation in the position of the stops 47, 48. Thus by mounting the stops 47, 48 in various selected ones of the mounting holes 55, the position at which further travel of the associated recording pen 14 or 15 is arrested by the stops 47 or 48 may be varied as desired.

FIG. 6 illustrated a portion of the mechanism as shown in FIG. 5 with an alternative arrangement for varying the limits of travel of the cable driven pen mechanism. In FIG. 6 two spacers 56 are shown fitted on the stop guide 49 against the stop 47. Thus the position at which the relative movement between the stop guide follower and the stop guide is arrested may be selectively varied by selection of an appropriate number of properly dimensioned spacers 56 to be placed on the stop guide 49. The spacers 56 may be placed on the guide near either of the guide stops 47 and 48 in order to control the point at which further travel is limited in a given direction.

The above described arrangements in accordance with the present invention advantageously provide a mechanism for limiting the travel of a cable-driven recording pen in a strip chart recorder which is lightweight, compact, and economical to produce. The actual mechanism can be positioned at a point relatively remote from the movable pen itself with the connection between the two being in the form of a cable, thus permitting the drive cables for the different pens to be stacked one above the other in a relatively thin space. A positive stopping action is provided and the mechanism may also be used very readily for the setting of a given reference input level to correspond to a fixed position of the associated pen. The position at which travel of the pen is limited may be easily adjusted by either varying the position of the stops along the spiral guide or by placing a number of spacers along the guide against the stops. By virtue of the fact that a spiral guide is employed having a circumferential traverse in excess of 360°, the cable sheave driving the pen cable may be rotated through more than one complete circle, thus effectively extending the distance that the pen may be made to traverse relative to its drive pulley.

Although there have been described and shown hereinabove specific arrangements of a travel limiting mechanism in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A travel limiting mechanism for a strip chart recorder or the like comprising a first driven rotating member, a second rotating member mechanically coupled to said first member to rotate therewith, a guide mechanism comprising a pair of guide stops affixed to the second rotating member and a spiral guide mounted between the stops, a guide follower constrained to move in only a radial direction relative to said first and second rotating members, said guide follower engaging said spiral guide, and means for driving the first rotating member, whereby continued rotation of the second rotating member is arrested by contact between a guide stop and the guide follower.

2. A travel limiting mechanism in accordance with claim 1 wherein said guide stops are mounted approximately 180° apart about the periphery of the second rotating member, and the spiral guide extends about the second rotating member approximately one and one-half times between the guide stops.

3. A travel limiting mechanism in accordance with claim 1 further including a slidable clutch means coupling the first and second rotating members.

4. A travel limiting mechanism in accordance with claim 3 wherein said clutch means comprises a pad of cork-like material positioned between adjacent mating surfaces of the first and second rotating members.

5. A travel limiting mechanism for a strip chart recorder or the like comprising a first driven rotating member, a second rotating member mechanically coupled to said first member to rotate therewith, a guide mechanism comprising a pair of guide stops affixed to the second member and a spiral guide mounted between the stops, a guide follower constrained to move in only a radial direction relative to said first and second rotating members, said guide follower engaging said spiral guide, means for driving the first rotating member, and means for releasably engaging said first and second members whereby said second member is released from further rotation when the guide follower engages one of the guide stops at the end of the spiral guide.

6. A travel limiting mechanism for a strip chart recorder or the like comprising a first driven rotating member, a second rotating member mechanically coupled to said first member to rotate therewith, a guide mechanism comprising a pair of guide stops affixed to the second rotating member and a spiral guide mounted between the stops, said spiral guide comprising a spiral wire extending along a circumferential path in excess of 360°, a guide follower constrained to move along the spiral guide in only a radial direction relative to said first and second rotating members and having a transverse opening through which the spiral guide extends, and means for driving the first rotating member.

7. A travel limiting mechanism in accordance with claim 6 further including means for adjusting points at which relative movement between the guide and the guide follower is limited.

8. A travel limiting mechanism in accordance with claim 7 wherein said adjusting means comprises a plurality of means positioned along the periphery of the second rotating member for receiving the guide stops.

9. A travel limiting mechanism in accordance with claim 7 wherein said adjusting means comprises at least one spacer positioned on the spiral guide adjacent one of the stops.

10. A travel limiting mechanism for a strip chart recorder or the like comprising a first driven rotating member; a second rotating member mechanically coupled to said first member to rotate therewith; a guide mechanism comprising a pair of guide stops affixed to the second rotating member and a spiral guide mounted between the stops; a guide follower constrained to move in only a radial direction relative to said first and second rotating members, said guide follower engaging said spiral guide; means for driving the first rotating member; means for releasably engaging said first and second members whereby said second member is released from further rotation when the guide follower engages one of the guide stops at the end of the spiral guide; and means for resiliently urging said first and second rotating members toward each other comprising a recessed portion on the side of said second rotating member remote from said first rotating member, a portion of said first rotating member extending through a central opening in said second rotating member, and a pressure disk and a spring associated therewith connected to the portion of said first rotating member extending through said second rotating member and adapted to urge said rotating member toward said first rotating member.

11. A travel limiting mechanism in accordance with claim 10 further including a bearing positioned within the recessed portion of the second rotating member and presenting a bearing surface for said pressure disk.

References Cited by the Examiner

UNITED STATES PATENTS

| | | | |
|---|---|---|---|
| 2,436,717 | 2/1948 | Foster | 192—139 X |
| 2,746,573 | 5/1956 | Hastings | 192—139 X |
| 2,886,759 | 5/1959 | Umrath | 346—32 X |

RICHARD B. WILKINSON, *Primary Examiner.*

J. W. HARTARY, *Assistant Examiner.*